Jan. 21, 1936.  W. L. WRIGHT  2,028,485
OPTICAL SYSTEM AND AUTOMATIC CONTROL FOR THE SAME
Filed Nov. 20, 1933  2 Sheets-Sheet 2
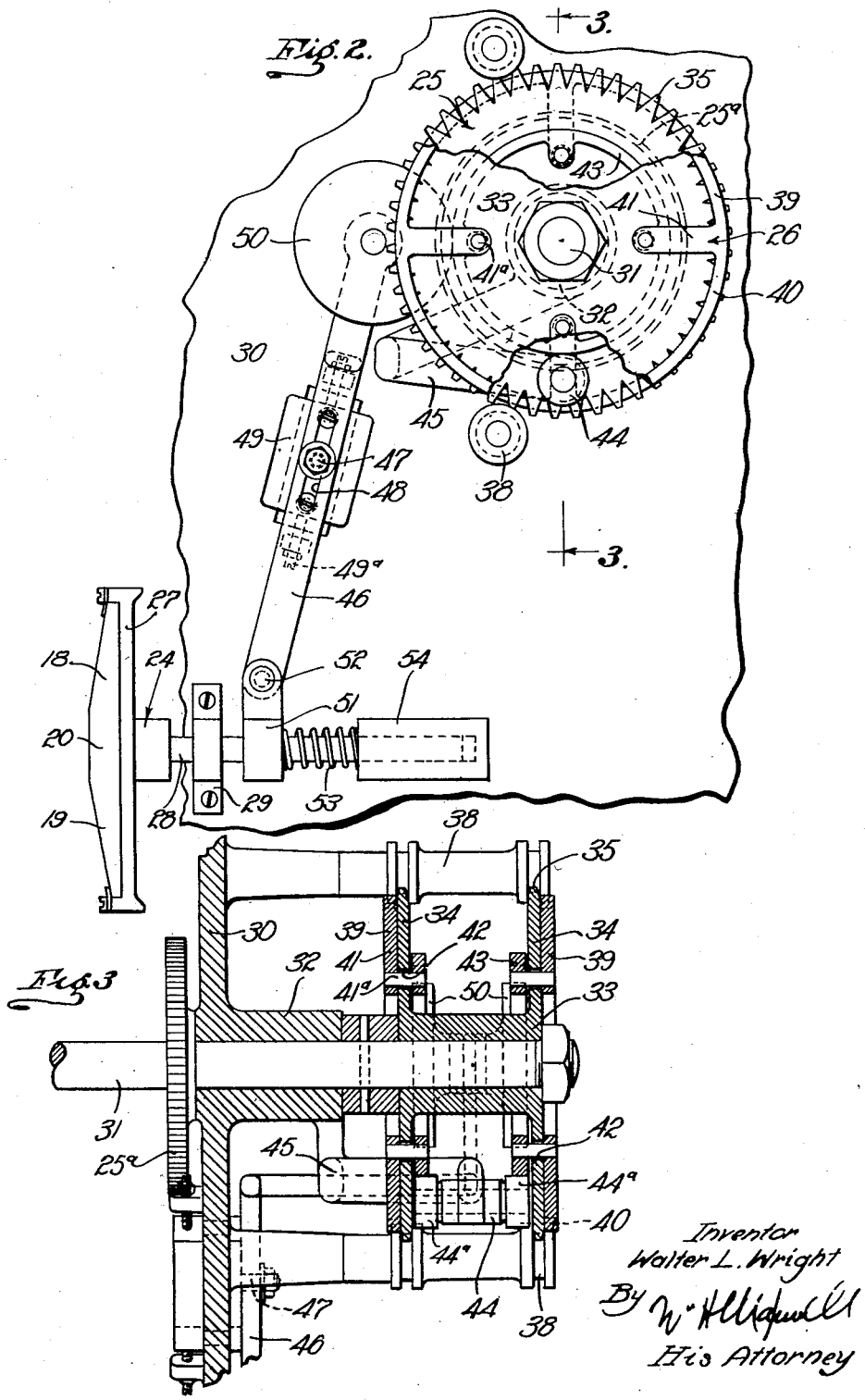
Inventor
Walter L. Wright
By [signature]
His Attorney Patented Jan. 21, 1936

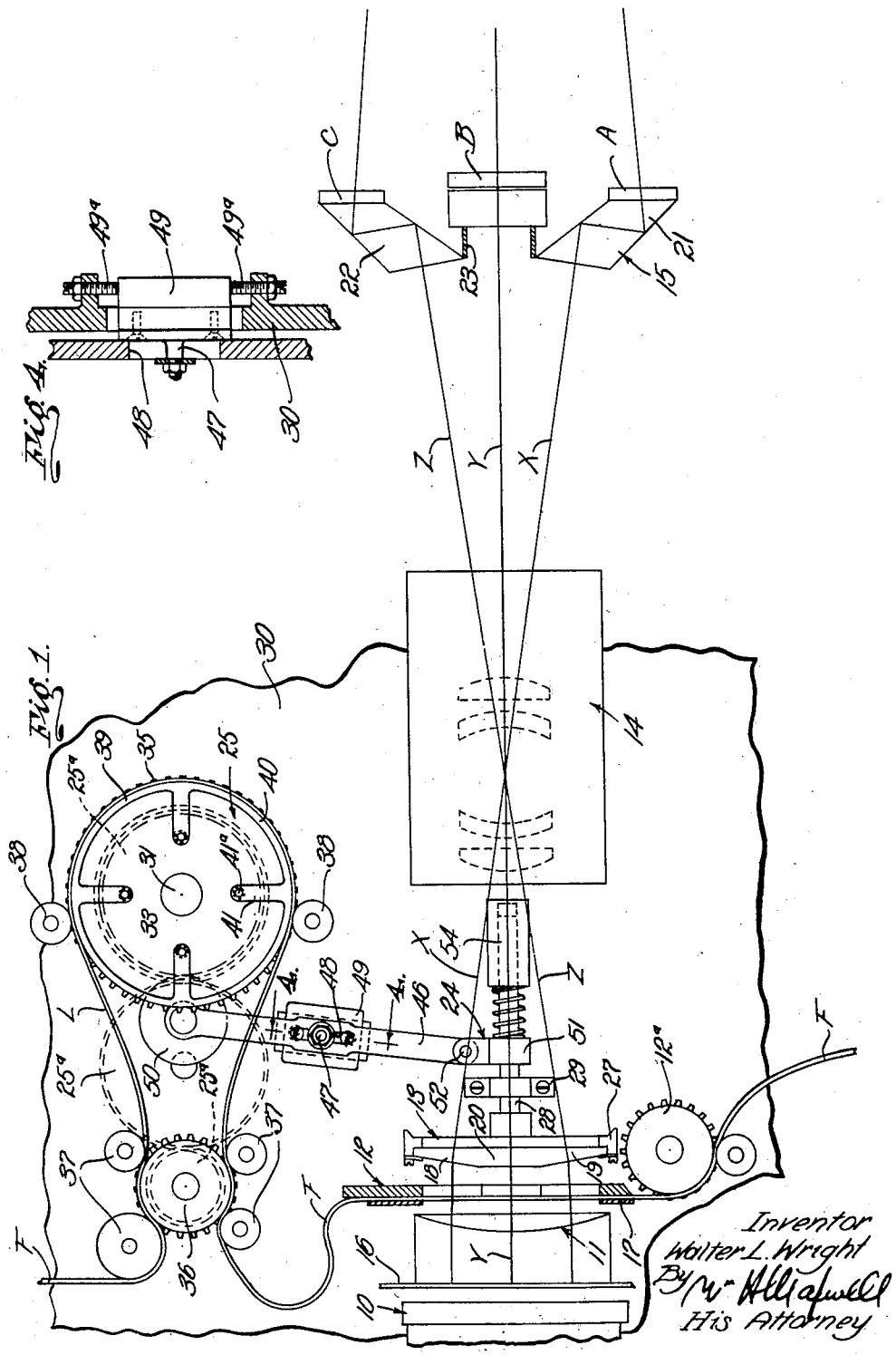

2,028,485

UNITED STATES PATENT OFFICE 2,028,485

OPTICAL SYSTEM AND AUTOMATIC CONTROL FOR THE SAME

Walter L. Wright, Santa Monica, Calif., assignor to Synchrome Corporation, Santa Monica, Calif., a corporation of California Application November 20, 1933, Serial No. 698,763

14 Claims. (Cl. 88—16.4)

This invention has to do with motion picture apparatus and has particular reference to an optical system for a motion picture projector. A general object of the invention is to provide a simple, practical, and effective optical system for use in projecting a plurality of pictures onto a screen simultaneously and in register and to provide a control for such an optical system for ensuring the projection of several pictures onto the screen in perfect register.

In certain methods of producing colored motion pictures, a film is produced bearing series of images of a subject, each series consisting of a plurality of images or pictures arranged longitudinally of the film, each image of the series being of a different color value of the subject. In accordance with one method of producing colored motion pictures, each series of pictures comprises three pictures arranged side by side longitudinally of the film, each picture of the series being of a different color value of the subject, the several pictures of each series having been taken simultaneously from a single point of vision, so that they are in register to form a single colored picture when projected on the screen in register. Celluloid and gelatin, which form the motion picture film, vary in size under various conditions and usually shrink with age. The variations in the size of the film are principally longitudinally of the film strip and cause differences in the relative positions or spacing of the pictures of the several series. Where series of a plurality of pictures of the same subject, taken simultaneously from a single point of vision, are projected onto a screen from a projector, the shrinkage or variation in the length of the film often causes the several pictures to be projected onto the screen out of perfect register.

An object of the present invention is to provide an optical system for a projector, for handling motion picture film of the general character referred to, and a control for the optical system that automatically compensates for variation in the length of the film, so that the several pictures of the series are projected on the screen in perfect register.

Another object of the invention is to provide a control for an optical system of the character referred to that includes means for automatically and constantly measuring the film and for automatically shifting or operating an element of the optical system in accordance with any variation in the length of the film, so that the optical system at all times properly projects the pictures onto the screen in perfect register.

Another object of the invention is to provide an optical system of the character referred to that includes a shiftably mounted lens element and an automatic control that shifts or operates the lens element in accordance with any variation that may occur in the size or length of the film, resulting in proper registering of the pictures on the film.

It is another object of the invention to provide a control means or device of the character mentioned that is entirely automatic in its operation.

It is another object of the invention to provide an automatic control for an optical system of the character mentioned that is adjustable so as to provide for the proper operative relationship between the control and the shiftable lens element of the system.

Another object of the invention is to provide a control device of the character mentioned that constantly measures the film during its passage through the projector and that is actuated through its engagement or co-operation with the film.

It is another object of the invention to provide an automatic control device of the character mentioned in which the shifting or operation of the lens element of the optical system is smooth and gradual, even when a sudden or large variation in the length of the film or spacing of the pictures on the film occurs, so that the change in the projected pictures is not perceptible.

Other objects and features of my invention will be best and more fully understood from the following detailed description of a typical form and application of the invention, throughout which description reference will be had to the accompanying drawings, in which:

Fig. 1 is a side elevation of the optical system and the control for the optical system, illustrating the optical system diagrammatically. Fig. 2 is an enlarged side elevation of the automatic control embodied in the present invention, showing it independent of other parts of the projector. Fig. 3 is an enlarged vertical detailed sectional view taken as indicated by line 3—3 on Fig. 2, and Fig. 4 is an enlarged detailed sectional view taken on line 4—4 of Fig. 1.

The present invention may be employed to handle film of various forms and types, but is particularly suited for handling motion picture film bearing a plurality of longitudinally arranged series of pictures, each series comprising a plurality of pictures of different color values of a subject taken simultaneously from a single point of vision and arranged longitudinally of the film. In handling film of this character, a separate shaft of light is passed through each picture of the series and the several shafts of light are then handled so as to fall onto the screen in register and form a single image or picture. Throughout the following detailed disclosure, the invention will be described as embodied in a projector optical system and a control therefor that is intended to simultaneously project three spaced beams of light through three adjoining pictures of different color values, which beams are brought into register on a screen to form a single picture. The automatic control provided by the present invention may be employed in optical systems of various characters and for controlling the operation of various types of lenses or optical elements. In the present disclosure, the automatic control will be described in combination with an improved optical system for handling film of the general character referred to above, which system is fully set forth and claimed in United States Letters Patent issued to me entitled Optical system for projectors Number 1,938,950, issued December 12, 1933.

The optical system illustrated comprises, generally, a source of light 10, a condensing lens 11, a film gate 12 for holding the film in the path of light from the lens 11, so that shafts of light are simultaneously passed through the several pictures of a series of pictures on the film, means 13 for intercepting the shafts of light passed through the end pictures of the series and for deflecting them so that they converge to intersect the shaft of light passed through the central picture of the series at a point a short distance in front of the film, a projection lens 14 receiving the several shafts of light passed by the film, and means 15 in front of the projection lens to change the direction of travel of the shafts of light passed through the end pictures of the series.

The light source 10 may be any suitable form of single light source, or may consist of individual light sources for passing light through the several pictures of the series on the film F at the gate 12. A shutter 16 may be provided between the light source 10 and the gate 12 to intermittently interrupt the shafts of light in synchronism with the film moving mechanism of the projector. In the drawings, I have designated the three individual shafts of light as X, Y, and Z.

The condensing lens 11 is included in the optical system so that a projection lens 14 of a short focal length may be employed. The condensing lens 11 is arranged between the shutter 16 and the film gate 12 to intercept the three light shafts X, Y, and Z. The film gate 12 is provided to guide the film F and hold it in position in the shafts of light X, Y, and Z. In accordance with the broader principles of the invention, any suitable form of film gate may be employed. In the drawings, I have shown the gate 12 as including an aperture plate 17 having an aperture of sufficient size to permit the passage of light through the several pictures of a series on the film. An intermittently operated sprocket 12a is mounted below the gate 12 to operate the film F through the gate. The sprocket 12a may turn one-half a revolution for each operation to give the film the desired movement. The sprocket may be operated by any suitable intermittent movement mechanism, such mechanisms being familiar to those skilled in the art.

In the embodiment of the invention disclosed in the drawings, the means 13 is the part or element of the optical system controlled by the automatic control means included in the invention and is adapted to be shifted or adjusted by the control means to ensure the perfect registration of the light shafts X, Y, and Z on the screen. The means 13 is primarily intended to deflect the light shafts X and Z carrying the images of the end pictures of the series so that they intersect the shaft Y carrying the image of the central picture of the series at a point a relatively short distance in front of the gate 12. In the particular optical system illustrated, the means 13 is a prismatic means and includes two spaced prisms 18 and 19 in the paths of the light shafts X and Z. The prisms 18 and 19 are positioned and are of such character as to cause the shafts of light X and Z to intersect the central shaft Y adjacent the center of the projection lens 14. In accordance with the broader principles of the invention, the two prisms 18 and 19 may be separate or individual parts or may be formed on a single piece of glass, or the like, in which case the center light shaft Y passes through a plano-section 20 connecting the two prism sections 18 and 19. The means or element 13 may be achromatic to prevent chromatic aberration. The mounting of the prism element 13 will be hereinafter described in connection with the automatic control means for governing its operation.

The projection lens 14 is spaced a considerable distance in front of the film gate. The optical system is preferably designed so that the light shafts X and Y carrying the images of the end pictures of the series intersect one another and the central light shaft Y at a point within the projection lens. The lens 14 may be a projection lens of the type commonly employed in the projection of motion pictures.

The means 15 is provided at a suitable distance forward or in front of the projection lens 14. In accordance with the invention, the means 15 operates to intercept the shafts of light X and Z after their passage through the projection lens 14 and deflect them so as to extend forwardly substantially parallel to the middle shaft of light Y. In accordance with the present invention, the means 15 includes spaced prisms 21 and 22 to handle the end shafts of light X and Z. The two prisms 21 and 22 are alike and are spaced apart to be in position to intercept the spaced shafts X and Z. The prisms 21 and 22 are oppositely arranged or positioned with respect to one another and intercept the divergent shafts X and Z and divert them so as to slightly converge. The optical elements or prisms 21 and 22 are in the nature of rhomboid prisms, each presenting two reflecting surfaces. It will be apparent that the prisms 21 and 22 may be adjusted or set so that the light shafts X and Z properly register on the screen under normal conditions of operation. The prisms 21 and 22 may be designed to under-throw or overthrow the deflected shafts of light, making it possible to move element 13 in a predetermined direction to make the desired connection.

Means may be embodied in the system to chromatically influence or modify the individual light shafts. In accordance with the broader principles of the invention, the means for chromatically influencing the shafts of light may be provided at any suitable point in the system. In the specific arrangement disclosed in the drawings, light filters A, B, and C are arranged to pass the three light shafts X, Y, and Z, respectively. In practice, the filters may be optically flat colored glass plates cemented on any of the four sides of the prisms 21 and 22. The filters A and C are shown arranged in connection with the prisms 21 and 22, while the filter B is in the shaft Y near the prisms 21 and 22. A shield 23 may extend rearwardly from the filter B to prevent any undesirable dispersion of light.

The automatic control means embodied in the present invention operates to automatically measure a portion of the film F to determine the longitudinal arrangement or disposition of the picture areas on the film and to shift the optical means or element 13 in accordance with any variation in the spacing of the picture areas on the film to ensure the exact registration on the screen of the three light shafts X, Y, and Z. The automatic control includes, generally, means 24 shiftably mounting or supporting an element of the optical system, such as the element 13 of the optical system, and means 26 engaging or measuring a portion of the film F to determine the longitudinal disposition of the pictures on the film, and operatively connected with the shiftable element 13. In the form of the invention herein set forth, the film engaging means includes a sprocket 25 engaged by the film, and means at the sprocket gauging the film as it passes the sprocket.

The means 24 mounts the optical element 13 for movement longitudinally of the optical system and at right angle to the film F at the gate 12 so as to adapt the optical system to properly register the shafts X, Y, and Z when carrying the images of pictures of various spacings. The mounting means 24 includes a carrier 27 supporting the lens element 13, which lens element consists of the prismatic sections 18 and 19 and the central section 20. A rod 28 supports the carrier 27. The rod 28 extends parallel to the central longitudinal axis of the optical system and is supported for longitudinal movement. A bearing or bracket 29 is mounted on the case 30 of the projector to support and guide the rod 28 for longitudinal movement.

The sprocket 25 is provided to continuously engage or handle the film F before its passage through the aperture 12. In the preferred embodiment of the invention, the sprocket 25 is mounted in the case 30 above and forward of the film gate and aperture 12, and far enough removed from the gate so that it handles continuously moving film. A shaft 31 is provided to carry the sprocket 25 and extends through a boss 32 projecting from the inner side of the case 30. The shaft 31 is geared to or driven by the mechanism of the projector so that the sprocket 25 is rotated continuously at the proper speed.

The sprocket 25 includes a hub 33, fixed on the projecting inner end of the shaft 31, and spaced ends or flanges 34 on the hub. Teeth 35 are provided on the peripheries of the flange 34 to engage or co-operate with the perforations in the film F. It is preferred to make the teeth 35 comparatively deep to allow for tightening or inward movement of the film on the sprocket 25. The sprocket 25 is mounted in the case 30 at a point to engage the inner side of a loop L in the film F. A constantly rotated sprocket 36 is mounted adjacent the sprocket 25, and pairs of spaced rollers 37 are provided to retain the film in engagement with the sprocket 36. The loop portion L of the film passes from the upper edge of the sprocket 36 around the sprocket 25 and then engages the lower portion of the sprocket 36. The sprockets 36 and 25 are geared together by gears 25ª to operate in synchronism so that there is always a constant continuously moving film loop engaging the sprocket 25. It is preferred to provide a comparatively loose or slack portion in the film F between the lower edge of the sprocket 36 and the film gate 12. By providing the loop L and by engaging the film F at longitudinally spaced points by the sprocket 36, the film does not have any undesirable intermittent or irregular movement during its passage around the sprocket 25.

The invention includes means for holding the film F in engagement with the sprocket 25 at longitudinally spaced points. Two rollers 38 are arranged to hold the film F in engagement with the sprocket 25 adjacent the point it passes onto the sprocket 25 and adjacent the point it passes from the sprocket 25. The rollers 38 are spaced so that a substantial length of film is engaged around the sprocket. By holding the film in engagement with the sprocket 25 at the point where it passes onto the sprocket and at the point where it leaves the sprocket, the portion of the film passing around the sprocket is adapted to be engaged and measured by the means 26, as will be hereinafter described. The spaced perforations in the film bear a definite relation to the disposition of the pictures on the film, and the engagement of the teeth 35 with perforations at points spaced longitudinally of the film permits the means 26 to accurately measure the portion of the film and therefore to determine the longitudinal disposition of the pictures on the film.

The means 26 engages and measures the portion of the film extending around the sprocket 25 between the rollers 38 and adjusts or sets the optical element 13 in accordance with the length of film and, therefore, in accordance with the longitudinal spacing of the pictures. The means 26 includes shoes 39 carried by the sprocket 25 for engaging the film F. The shoes 39 are arranged at the outer sides of the flanges 34 and are adapted to engage the film F adjacent its opposite longitudinal edges. Each of the shoes 39 includes an annular rim 40 for engaging the film and spokes 41 extending radially inward from the rim. In the preferred construction, the shoes 39 are integral members formed of a material that is light in weight. Connections are provided between the shoes 39 and the sprocket 25 so that the shoes rotate with the sprocket and are free to shift radially of the sprocket. Pins 41ª are provided on the inner ends of the spokes 41 and extend axially inward through openings 42 in the flanges 34. The openings 42 pass the pins 41ª with clearance to allow for the radial movement of the shoes 39 on the sprocket. Rings 43 are attached to or carry the inner ends of the pins 41ª. There is one ring 43 at the inner side of each flange 34. A roller 44, mounted on a relatively stationary arm 45, engages the spaced rings 43. The roller 44 engages the rings 43 at points spaced vertically downward from the shaft 31 so as to support the rings and shoes 39 for radial movement in a horizontal direction. The arm 45 which carries the roller 44 may be mounted on the inner side of the case 30 of the projector. For example, it may project from the boss 32. In practice, the roller 44 may have two independently rotatable anti-friction sleeves 44ª for engaging the peripheries of the rings 43.

An operative connection is provided between the film-engaging shoes 39 and the carrier 27 supporting the lens element 13. The operative connection includes a lever 46 pivotally mounted on the case 30 intermediate its ends. A pin 47 pivotally supports the lever 46 on the inner wall of the case 30. The pin 47 passes through an elongated opening or slot 48 in the lever and is carried on a block 49 adjustably mounted on the case 30. The block 49 is adapted to be set in the desired position by screws 49ª. A wheel or roller 50 is rotatably mounted on the outer end of the lever 46 to bear against or engage the rings 43.

The upper end portion of the lever 46 is offset laterally so that the roller 50 is mounted to extend between the flanges 34 of the sprocket 25. In the preferred construction, the roller 50 engages the rings 43 to urge the shoes against the portion of film looped around the sprocket 25.

The lower end of the lever 46 is connected with the rod 28. A yoked collar 51 is fixed on the rod 28, and the lower end of the lever 46 is pivotally connected with the collar 51 at 52. It will be apparent how movement of the shoes 39, caused by variation in the length of the loop of film F or sprocket 25, is transmitted to the lever 46 through the rings 43 and roller 50 to cause corresponding movement of the rod 28 in an opposite direction. The invention includes means for normally yieldingly urging the shoes 39 forwardly so as to pressurally engage the loop portion of the film F extending around the sprocket 25 between the retaining rollers 39. A helical spring 53 surrounds the rod 28 and engages or reacts against the collar 51. The spring 53 operates to normally yieldingly urge the lens element and the lower end of the lever 46 rearwardly and, accordingly, urges the upper end of the lever 46 forwardly so that the shoes 39 are maintained in pressural engagement with the film F extending around the sprocket 25. This keeps slack or play out of the mechanism.

In the preferred form of the invention, means is provided for modifying the action of the control means so that the optical element 13 will be shifted or moved smoothly and slowly in the event that a sudden variation in the length of the film F is present. The means for modifying the action of the control is in the nature of a dash pot means and includes a cylinder or dash pot 54 slidably receiving the forward end of the rod 28. The cylinder or dash pot 54 slidably receives the rod 28 with suitable clearance so that longitudinal movement of the rod is yieldingly resisted. In the particular construction illustrated in the drawings, the spring 53 is arranged under compression between the rear end of the cylinder 54 and the collar 51.

It is believed that the operation of the optical system and the automatic control will be readily apparent from the foregoing detailed description. The shoes 39 are normally urged forwardly against the loop of film F extending around the sprocket 25 between the rollers 38 so that this portion of the film is under tension. The teeth 35 of the sprocket engage or co-operate with the perforations in the film at points adjacent the spaced rollers 38 so that the film is maintained in operative engagement with the sprocket 25 at these two spaced points. The forward looped portion of the film passing around the sprocket between the rollers 38 is at all times engaged by the peripheral edges of the shoes 39. The shoes 39, in being pressed forwardly by the spring 53, hold the forward portion of the loop L under tension and out of engagement with the teeth 35 along the forward edge of the sprocket. In this manner, the shoes 39 operate to continuously measure or gauge the length of the film between the points where it more or less tightly engages the teeth 35 of the sprocket adjacent the rollers 38. The pivotal axis of the lever 46 may be adjusted by means of the screws 49ª to provide for the desired relationship between the movement of the shoes 39 and the movement of the rod 28 and the optical element 13 carried thereby.

The lever 46 may be adjusted so that the optical element 13 is normally maintained in a definite position with respect to the other parts of the optical system, so that the optical system is adapted to properly handle film of a given length, or, more properly, to handle film on which the pictures have a certain spacing or longitudinal disposition on the film. In the event that the film, or a portion of the film, varies in length, so that the spacing of the series of pictures occurring thereon is different from that for which the optical system was primarily set, the shoes 39, in pressurally engaging the looped portion of the film passing around the sprocket 25, automatically shift or react in accordance with the variation. If the portion of the loop L of film occurring between the points of active contact of the film with the sprocket 25 is of less length than that portion of the film which was initially measured by the shoes 39, the shoes 39 and the upper end part of the lever 46 are shifted or urged rearwardly due to the tightening or tensioning of the film passing over the sprocket 25. Rearward movement of the shoes 39 and the upper end of the lever 46 causes a forward movement of the rod 28 and the optical element 13 mounted on the rod. The forward movement of the optical element or prismatic lens 13 causes the light shafts X and Z to intersect the central light shaft Y at a point spaced slightly forward from the point at which they formerly intersected the shaft Y. This brings the shafts X and Y closer together during their passage through the means 15 and, accordingly, brings them into register on the screen. It is obvious that shrinkage of the film causes less spacing of the pictures of the series on the film F so that the lens element 13, in moving forwardly as just described above, operates to compensate for the closer spacing of the pictures on the film so that the shafts X, Y, and Z are brought into correct register on the screen. It is believed that it will be apparent how an elongated or stretched portion of film passing over the sprocket 25 will cause the spring 53 to urge the shoes 39 forwardly and cause the rod 28 and the optical element 13 to move rearwardly. Rearward shifting of the optical element 13 causes the light shafts X and Z to intersect the central shaft Y at a more rearward point so that the end shafts X and Z are spaced further apart during the passage through the means 15, and, accordingly, the longer spacing of the pictures on the film F is compensated for.

The dash pot 54 ensures the smooth even operation of the control so that the optical element 13 is never abruptly or rapidly shifted. The rod 28 is guided so that the optical element 13 is movable only directly longitudinally of the axis of the optical system, so that undesirable aberrations and deflections cannot occur. The screws 49ª may be positioned to be accessible for manual manipulation, so that the lever 46 may be readily adjusted to provide for the desired relative movement between the shoes 39 and the optical element 13 carried by the rod 28. It is to be understood that the automatic control provided by the present invention may be utilized to shift optical elements or lenses of various characters in accordance with variations in the spacing of picture areas on strips of film, and that the invention is not to be taken as restricted to the application of the automatic control described above.

Having described only a typical preferred form of my invention, I do not wish to limit myself to the specific details set forth, but wish to reserve to myself any changes or variations that may appear to those skilled in the art or fall within the scope of the following claims:

Having described my invention, I claim:

1. In a projector for projecting a series of pictures arranged longitudinally of a photographic film, an optical system including means for passing shafts of light through the several pictures of a series, and a plurality of optical elements operable to direct the said shafts of light so that their images fall into register on a screen, one of the optical elements being operable to direct a plurality of said shafts of light and being shiftable relative to the other elements to effect the registration of the images when there are variations in the length of the film, and a control for the optical system operable to move and position said optical element to compensate for variations in the length of a portion of the film, said control including means engaging the film at longitudinally spaced points and a shiftable member operatively associated with the said optical element and having engagement with the portion of film between said points to move in response to variations in its length.

2. In a projector for projecting a series of pictures arranged longitudinally of a photographic film, an optical system including means for passing shafts of light through the several pictures of a series, and a plurality of optical elements operable to direct the said shafts of light so that their images fall into register on a screen, one of the optical elements being operable to direct a plurality of said shafts of light and being shiftable relative to the other elements to effect the registration of the images when there are variations in the length of the film, and a control for the optical system operable to adjust said optical element, said control including means engaging the film at longitudinally spaced points, and a movable member connected with the said optical element and engaged by the portion of film between said points to move in response to variations in its length.

3. In a projector for projecting a series of pictures arranged longitudinally of a photographic film, an optical system including means for passing shafts of light through the several pictures of a series, and a plurality of optical elements operable to direct the said shafts of light so that their images fall into register on a screen, means supporting one of the optical elements for adjustment longitudinally of the axis of the optical system whereby the element is operable to effect registration of the images when the pictures bear different longitudinal relationships, and a control for the optical system including a movable member urged against a selected portion of the film to move in response to variations in its length, and a connection between said optical element and the member whereby the optical element is adjustable to maintain registration of said images when said variations occur.

4. In a projector for projecting a series of pictures arranged longitudinally of a photographic film, an optical system including means for passing shafts of light through the several pictures of a series, and a plurality of optical elements operable to direct the said shafts of light so that their images fall into register on a screen, one of the optical elements being operable to direct the images of the end pictures of the series, means supporting said element for adjustment with respect to the other elements to effect the registration of the images when the longitudinal disposition of the pictures varies, and a control for the optical system including means engaging the film at longitudinally spaced points to hold a selected portion of the film deviated, a movable member bearing on said portion of the film to move in response to variations in its length, and a connection between the said optical element and the movable member whereby the said optical element is adjusted to compensate for said variations and maintain the said images in registration.

5. In a projector for projecting a series of pictures arranged longitudinally of a photographic film, an optical system including means for passing shafts of light through the several pictures of a series, and a plurality of optical elements operable to direct the said shafts of light so that their images fall into register on a screen, one of the optical elements being operable to direct a plurality of said shafts of light and being shiftable in the direction of the axis of the optical system relative to the other optical elements to effect the registration of the images when there are variations in the length of the film, and a control for the optical system including means for maintaining a portion of the film deviated and substantially free, a member urged against said portion to move in response to variations in its length, and a connection between the said optical element and member whereby movement of the member causes movement of the element to maintain said images in registration.

6. In a projector for handling film bearing a plurality of series of several pictures arranged longitudinally of the film, an optical system comprising means for passing light through the several pictures of a series, and optical elements acting on the light after its passage through the film and operable to direct the shafts of light from said pictures so that the images of the pictures fall into registration on a screen, one of the elements being shiftable in the direction of movement of the light relative to the other elements to effect the registration of the images when there are variations in the length of the film, and a control for the said element including means continuously engaging the film at longitudinally spaced points, a shiftable shoe engaging the film between said points to move in response to variations in the length of said portion, and an operative connection between the shoe and said element whereby the said element is moved to maintain the images in registration.

7. In a projector for handling film bearing a plurality of series of several pictures arranged longitudinally of the film, an optical system comprising means for passing light shafts through the several pictures of a series, and optical elements acting on the light shafts after their passage through the film and operable to direct the light shafts so that the images of the pictures fall into registration on a screen, one of the elements directing spaced light shafts and being shiftable in the direction of the axis of the system relative to the other elements to effect the registration of the images when there are variations in the length of the film, and a control for the said element including, means continuously engaging the film at longitudinally spaced points to maintain a deviated portion in the film, a shoe engaging said portion of the film, means yieldingly urging the shoe against the film, and an operative connection between the shoe and said element whereby the said element is moved to maintain the images in registration.

8. In a projector for handling film bearing a plurality of series of several pictures arranged longitudinally of the film, an optical system comprising means for passing light through the several pictures of a series, and optical elements acting on the light after its passage through the film operable to cause the images of the pictures to come into register on a screen, one of the elements being shiftable longitudinally of the optical system relative to the other elements to effect the registration of the images when there are variations in the length of the film, and a control for the said element including means continuously engaging the film at longitudinally spaced points, a shiftable shoe engaging the portion of film between said points to move in response to variations in its length, means modifying the action of the shiftable shoe, and an operative connection between the shoe and said element whereby movement of the shoe causes movement of said element to maintain the images in registration.

9. In a projector for handling film bearing a plurality of series of several pictures arranged longitudinally of the film, an optical system comprising means for passing light through the several pictures of a series, spaced deflectors, and an optical element acting on the light passed through the end pictures of a series to direct the images of the end pictures to the deflectors which are operable to direct them into registration with the image of the center picture of the series, said element being adjustable longitudinally of the optical system, and a control for the said element including a sprocket operatively engaging the film at spaced points, and a shiftable shoe engaging the portion of the film between said points to move in response to variations in its length, and an operative connection between the shoe and the said element.

10. In a projector for handling film bearing a plurality of series of several pictures arranged longitudinally of the film, an optical system comprising means for passing light through the several pictures of a series, and optical elements acting on the light after its passage through the film, a shiftable rod supporting one of the elements for movement whereby the element is operable to effect registration of the images when there are variations in the length of the film, and a control for the said element including a sprocket operatively engaging the film at spaced points, and a shiftable shoe engaging the portion of the film between said points to move in response to variations in the length of said portion, and an operative connection between the shoe and the said element including, a pivoted lever connecting the shoe and rod.

11. In a projector for handling film bearing a plurality of series of several pictures arranged longitudinally of the film, an optical system comprising means for passing shafts of light through the several pictures of a series, and a plurality of optical elements acting on the light after its passage through the film, one of the elements causing the light shafts from the end pictures of the series to converge, a shiftable rod supporting said element for adjustment where the said element is adjustable to effect registration of the images of the several pictures of the series when there are variations in the length of the film, and a control for the said elements including a sprocket operatively engaging the film at spaced points, and a shiftable shoe engaging the portion of the film between said points, and an operative connection between the shoe and the said element, including a pivoted lever connecting the shoe and rod, and dash pot means modifying the action of the rod and lever.

12. In a projector for handling film bearing a plurality of series of several pictures arranged longitudinally of the film, an optical system comprising means for passing shafts of light through the several pictures of a series, and a plurality of optical elements acting on the light after its passage through the film, one of the elements directing the light shafts from the end pictures of the series in a manner to cause the final registration of the images of the several pictures on a screen, the said element being shiftable whereby it is operable to effect registration of the images when there are variations in the length of the film, and a control for the optical system including a sprocket, means holding the film in engagement with the sprocket at spaced points, a shiftable shoe rotatable with the sprocket and engaging the film between said spaced points, means yieldingly holding the shoe in pressural engagement with the film, and an operative connection between the shoe and said element whereby the said element is shifted by the shoe.

13. An automatic control for an apparatus for handling film bearing a plurality of series of longitudinally disposed pictures, the apparatus including an optical element for acting on the light shaft passed through the end pictures of a series to direct them to finally come into registration with the light shaft from the center picture, which automatic control includes means mounting said optical element for movement whereby it is movable to maintain said registration when there are variations in the length of the film, a rotatable part positively engaging the film at longitudinally spaced points, and a shiftable shoe in engagement with the film between said points and movable in response to variations in its length, and an operative connection between the shoe and optical element whereby said element is moved to maintain said registration of the light shafts when the length of the film varies.

14. In a projector for handling film bearing a plurality of series of several pictures arranged longitudinally of the film, an optical system comprising means for passing light through the several pictures of a series, and a plurality of optical elements acting on the light after its passage through the film and operable to bring the images of the several pictures of the series into register on a screen, one of the elements being operable through movement to adjust the system to maintain the said images in register when there are variations in the length of the film, and a control for the optical system including a sprocket operatively engaging the film at spaced points, a shiftable shoe engaging the portion of the film between said points and movable in response to variations in its length, and an operative connection between the shoe and the said element, including a shiftable carrier for the element, a pivoted lever operatively connecting the shoe and carrier, and an adjustable pivotal mounting for the lever

WALTER L. WRIGHT.